United States Patent
Levisse et al.

(10) Patent No.: US 11,773,771 B2
(45) Date of Patent: Oct. 3, 2023

(54) TURBOMACHINE WITH COUNTER-ROTATING TURBINE FOR AN AIRCRAFT

(71) Applicant: SAFRAN AIRCRAFT ENGINES, Paris (FR)

(72) Inventors: Paul Ghislain Albert Levisse, Moissy-Cramayel (FR); Olivier Belmonte, Moissy-Cramayel (FR); Fabrice Joël Luc Chevillot, Moissy-Cramayel (FR); Clément Paul René Niepceron, Moissy-Cramayel (FR); Amélie Argie Antoinette Chassagne, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/782,510

(22) PCT Filed: Dec. 7, 2020

(86) PCT No.: PCT/FR2020/052305
§ 371 (c)(1),
(2) Date: Jun. 3, 2022

(87) PCT Pub. No.: WO2021/116578
PCT Pub. Date: Jun. 17, 2021

(65) Prior Publication Data
US 2023/0003168 A1    Jan. 5, 2023

(30) Foreign Application Priority Data

Dec. 10, 2019 (FR) ..................................... 1914013

(51) Int. Cl.
*F02C 3/067*  (2006.01)
*F02C 7/06*   (2006.01)
*F02C 7/36*   (2006.01)

(52) U.S. Cl.
CPC ................ *F02C 3/067* (2013.01); *F02C 7/06* (2013.01); *F02C 7/36* (2013.01); *F05D 2260/40311* (2013.01); *F05D 2260/98* (2013.01)

(58) Field of Classification Search
CPC .... F02C 3/067; F02C 7/06; F02C 7/36; F05D 2260/40311; F05D 2260/98; F01D 25/18
USPC ........................................................ 415/116
See application file for complete search history.

(56) References Cited

U.S. PATENT DOCUMENTS

| 2007/0006569 | A1 | 1/2007 | Brault et al. |
| 2012/0288358 | A1 | 11/2012 | Balk |

(Continued)

FOREIGN PATENT DOCUMENTS

| FR | 2 874 238 A1 | 2/2006 |
| FR | 2 955 085 A1 | 7/2011 |

OTHER PUBLICATIONS

English translation of Written Opinion dated Apr. 14, 2021, issued in corresponding International Application No. PCT/FR2020/052305, filed Dec. 7, 2020, 7 pages.

(Continued)

*Primary Examiner* — Yi-Kai Wang
(74) *Attorney, Agent, or Firm* — CHRISTENSEN O'CONNOR JOHNSON KINDNESS PLLC

(57) ABSTRACT

A turbomachine with a counter-rotating turbine for an aircraft includes a counter-rotating turbine and a mechanical reduction gear with an epicyclic, planetary-type gear train. The gear train includes a planet carrier secured to a stator housing of the turbomachine situated upstream from the counter-rotating turbine in relation to a direction of gas flow within the turbomachine. The planet carrier is secured to the stator housing by an annular part with an elongated shape (Continued)

extending inside the second shaft. The annular part includes an upstream end secured to the intermediate casing and a downstream end coupled to the planet carrier. The annular part also includes an integrated circuit for conveying lubrication oil from its upstream end to the planet carrier.

13 Claims, 4 Drawing Sheets

(56) References Cited

U.S. PATENT DOCUMENTS

| | | | |
|---|---|---|---|
| 2013/0225353 A1* | 8/2013 | Gallet | F01D 25/18 475/159 |
| 2019/0085720 A1 | 3/2019 | Pankaj et al. | |
| 2019/0085722 A1 | 3/2019 | Pankaj et al. | |
| 2021/0062910 A1* | 3/2021 | Baraggia Au Yeung | F16H 57/0427 |

OTHER PUBLICATIONS

International Preliminary Report on Patentability dated May 17, 2022, issued in corresponding International Application No. PCT/FR2020/052305, filed Dec. 7, 2020, 7 pages.

International Search Report dated Apr. 14, 2021, issued in corresponding International Application No. PCT/FR2020/052305, filed Dec. 7, 2020, 5 pages.

Written Opinion dated Apr. 14, 2021, issued in corresponding International Application No. PCT/FR2020/052305, filed Dec. 7, 2020, 6 pages.

* cited by examiner

TURBOMACHINE WITH COUNTER-ROTATING TURBINE FOR AN AIRCRAFT

TECHNICAL FIELD OF THE INVENTION

The present invention relates to a turbomachine with counter-rotating turbine for an aircraft.

TECHNICAL BACKGROUND

The technical background comprises in particular the documents FR-A1-3 013 325, FR-A1-2 955 085, FR-A1-2 998 867, US 2019/085722 A1 and FR 28 742 38 A1.

Typically, an aircraft turbomachine comprises, from upstream to downstream in the flow direction of the gases, a fan, a low-pressure compressor, a high-pressure compressor, an annular combustion chamber, a high-pressure turbine and a low-pressure turbine. The rotor of the low-pressure compressor is driven by the rotor of the low-pressure turbine, and the rotor of the high-pressure compressor is driven by the rotor of the high-pressure turbine.

From an engine performance and fuel consumption point of view, it is advantageous to maximize the rotational speed of the low-pressure turbine as this allows to obtain a better efficiency of the turbine. However, increasing the rotational speed of the turbine implies increasing the centrifugal forces it undergoes, and therefore greatly complicates its design.

One suggestion for increasing the efficiency of a turbine without increasing its rotational speed consists in using a counter-rotating turbine. The low-pressure turbine is then replaced by a two-rotor turbine a first rotor of which is configured to rotate in a first rotational direction and is connected to a first turbine shaft, and a second rotor is configured to rotate in an opposite direction of rotation and is connected to a second turbine shaft. The first rotor comprises turbine wheels interposed between turbine wheels of the second rotor.

A low-pressure turbine can have a rotational speed at take-off of about 4,000 rpm in a conventional architecture where the turbine drives the fan directly or a rotational speed at take-off of about 10,000 rpm (in an architecture where the turbine drives the fan by means of a reduction gear). Its replacement by a counter-rotating turbine whose rotors turn respectively at speeds at take-off of the order of 3,000 and 7,000 revolutions per minute allows to have a relative speed of 10,000 revolutions per minute (3000+7000) while having an absolute speed in a low range of the aforementioned speed interval.

This counter-rotating turbine comprises a slow rotor and a fast rotor, the slow rotor driving the fan and the fast rotor meshing with a mechanical reduction gear with an epicyclic gear train of the planetary type whose input and output are counter-rotating (rotating ring gear, stationary planet carrier, rotating sun gear).

The reduction gear couples the fast rotor and the slow rotor, allowing thus a power transfer from the fast rotor to the slow rotor. The higher efficiencies of a high-speed turbine are achieved by transferring a large portion of the power from the turbine towards the fan, not through a reduction gear but through a shaft.

This architecture is complex because of its mechanical integration: the mechanical reduction gear is located downstream of the turbomachine, radially inside a stator casing referred to as exhaust casing.

This positioning of the reduction gear involves placing numerous bearings and oil collection enclosures inside the exhaust casing. Furthermore, the reduction gear is located in a relatively hot area, which requires a thermal solution. The space inside the exhaust casing is therefore particularly constrained, which implies that the integration of the reduction gear must be worked on as much as possible and its implementation radius reduced.

To optimize the operation and the service life of the reduction gear, it is important to take up the torque to which its planet carrier is subjected during operation. Furthermore, the conveying of lubricating oil to the reduction gear is essential for its operation and is complex to implement in this restricted environment.

SUMMARY OF THE INVENTION

The present invention proposes an improvement to the technology described above, which represents a simple, effective and economical solution to at least some of the above problems.

The invention proposes a turbomachine with counter-rotating turbine for an aircraft, the turbomachine comprising a counter-rotating turbine a first rotor of which is configured to rotate in a first direction of rotation and is connected to a first turbine shaft, and a second rotor is configured to rotate in an opposite direction of rotation and is connected to a second turbine shaft, the first rotor comprising turbine wheels interposed between turbine wheels of the second rotor, the turbomachine further comprising a mechanical reduction gear with an epicyclic gear train of planetary type which comprises a sun gear driven in rotation by said second shaft, a ring gear driven in rotation by said first shaft, and a planet carrier attached to a stator casing of the turbomachine located upstream of the counter-rotating turbine with respect to a direction of flow of the gases in the turbomachine, characterised in that the planet carrier is attached to the stator casing by means of an annular part with an elongated shape extending inside said second shaft, this part comprising an upstream end attached to the intermediate casing and a downstream end coupled to the planet carrier, and in that this part comprises an integrated circuit for conveying lubricating oil from its upstream end to the planet carrier.

The part for connecting the stator casing to the planet carrier has a double function. It is coupled to the planet carrier and has a first function by this coupling of taking up the torque forces transmitted to the planet carrier during operation. These forces are transmitted by the part to the stator casing. The part also comprises a function for conveying lubricating oil to the reduction gear, and in particular its planet carrier.

The turbomachine according to the invention may comprise one or more of the following characteristics, taken alone from each other or in combination with each other:

said part is a one-piece, said part comprises a frustoconical section and a cylindrical section, the frustoconical section extending between said upstream end and the cylindrical section, and said cylindrical section extending between the frustoconical section and splines for coupling to the planet carrier, said circuit comprises an internal annular cavity at a junction between the frustoconical and cylindrical sections, said circuit comprises oil inlet pipelines which are formed in an extra thickness or in bosses in the frustoconical section and which extend upstream from said annular cavity to orifices located on an upstream face of the part, upstream of said splines, said circuit comprises oil outlet pipelines which are formed in an extra thickness or in bosses of the cylindrical section and which extend downstream from said annular cavity to orifices located on an external cylindrical surface of the downstream end, said cylindrical surface is located between two annular grooves for receiving annular seals, at least some of the pipelines are elliptical in cross-section, the splines are separated from the rest of the part by an annular weld bead, said planet carrier is generally L-shaped in cross-section and comprises a radial segment for supporting the shafts of the planet gears, and a cylindrical segment for coupling to said part, the planet carrier further comprising an integrated circuit for conveying oil from this part, and the turbomachine is of the type with a single shrouded fan.

The present invention also relates to a method for manufacturing the annular part described herein, said method comprising the steps of:

a) producing an upstream portion of the part by additive manufacturing, the upstream portion comprising the upstream end for attachment to the stator casing and at least partly the integrated lubricating oil conveying circuit;

b) producing a downstream portion of the part by forging, the downstream portion comprising the downstream end for coupling to the planet carrier;

c) welding the upstream and downstream portions thus produced.

Advantageously, the production of the upstream portion comprises the production of the cylindrical and frustoconical sections, and of the upstream end of the part, by additive manufacturing.

Preferably, the downstream portion of the part comprises splines for coupling to the planet carrier made of forged material.

BRIEF DESCRIPTION OF FIGURES

The invention will be better understood and other details, characteristics and advantages of the present invention will become clearer from the following description made by way of non-limiting example and with reference to the attached drawings, in which.

DETAILED DESCRIPTION OF THE INVENTION

Figure 1:
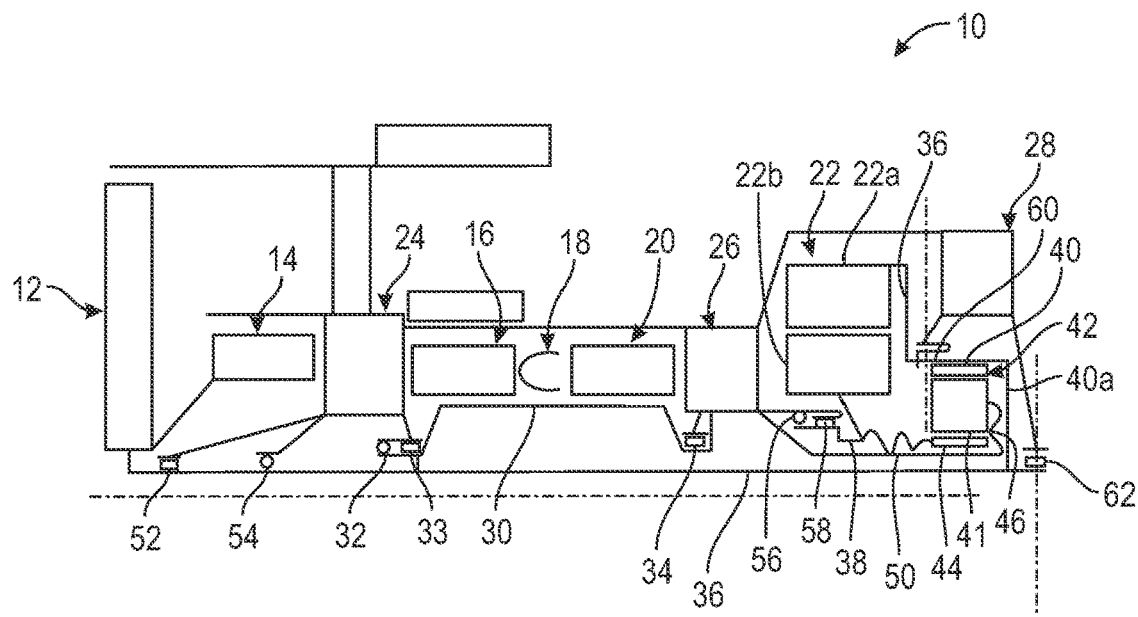
FIG. 1 is a very schematic axial cross-section view of a turbomachine with counter-rotating turbine.

FIG. 1 shows a very schematic representation of a turbomachine 10 with counter-rotating turbine for an aircraft.

This turbomachine 10 comprises from upstream to downstream, in the flow direction of the gases, a fan 12, a low-pressure compressor 14, a high-pressure compressor 16, an annular combustion chamber 18, a high-pressure turbine 20 and a counter-rotating turbine 22.

The reference 24 designates an intermediate casing located between the compressors 14 and 16, and the reference 26 designates a turbine casing (of the TVF type, which is an acronym for Turbine Vane Frame, which designates a turbine casing equipped with arms forming straightener bladings) located between the turbines 20 and 22. Finally, the reference 28 designates an exhaust casing (of the TRF type, an acronym for Turbine Rear Frame which designates the last turbine casing). These casings form the structure of the turbomachine: they support the bearings that guide the shafts in rotation and are linked to the suspensions of the turbomachine.

The rotor of the high-pressure turbine 20 drives in rotation the rotor of the high-pressure compressor 16 via a high-pressure shaft 30, which is centred and guided in rotation by bearings, such as an upstream ball bearing 32 and a downstream roller bearing 34. The bearing 32 is mounted between an upstream end of the shaft 30 and the intermediate casing 24, and the bearing 34 is mounted between a downstream end of the shaft 30 and the turbine casing 26.

Figure 2:
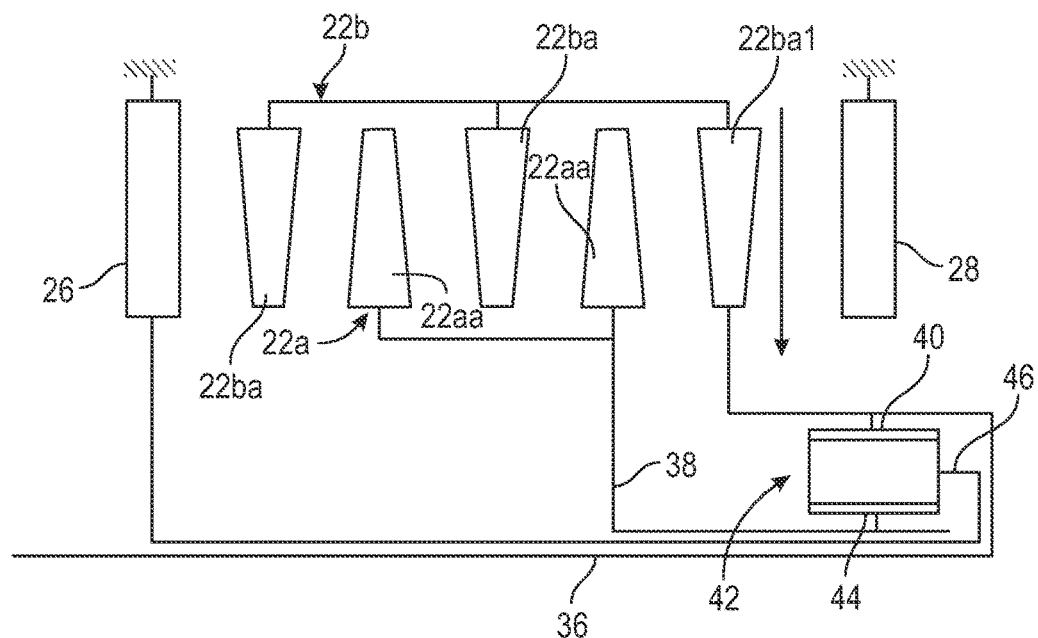
FIG. 2 is a larger scale view of the counter-rotating turbine in FIG. 1.

The counter-rotating turbine 22 comprises a first rotor 22*a* having wheels 22*aa* configured to rotate in a first direction of rotation and are connected to a first turbine shaft 36, and a second rotor 22*b* having wheels 22*ba* configured to rotate in an opposite direction of rotation and are connected to a second turbine shaft 38 and are interposed between the wheels 22*aa* of the rotor 22*a* (see FIG. 2).

Each turbine wheel comprises an annular row of blades, each of which comprises an aerodynamic profile comprising an intrados and an extrados that meet to form a leading edge and a trailing edge of the gases in the turbine duct.

The first shaft 36 drives in rotation the fan 12 and the rotor of the low-pressure compressor 14. This first shaft 36 is furthermore meshed with a ring gear 40 of a mechanical reduction gear 42 with epicyclic gear train of planetary type.

The second shaft 38 is meshed with the sun gear 44 or planetary of the reduction gear 42.

The reduction gear 42 further comprises planet gears 41 meshed with the sun gear 44 and the ring gear 40, respectively, and carried by a planet carrier 46 that is attached to the turbine casing 26.

Each of the casings 26 and 28 generally comprises a central hub, as well as an outer annulus that surrounds the hub and which is connected to the latter by a series of arms that are substantially radial with respect to the longitudinal axis of the turbomachine and passes through the turbine duct. The central hub of the casing 28 extends around at least one portion of the reduction gear 42.

In the example shown, the high-pressure shaft 30 is centred and guided in rotation by two upstream ball bearings 32 and roller bearings 33, respectively, and by a downstream roller bearing 34. The bearings 32, 33 are mounted between an upstream end of the shaft 30 and the intermediate casing 24, and the bearing 34 is mounted between a downstream end of the shaft 30 and the turbine casing 26.

The second shaft 38 has its downstream end meshed with the sun gear, as discussed above, and is further connected to the last stage or downstream stage of the second rotor 22b, i.e., to the last wheel 22ba1 of that rotor.

The second shaft 38 is centred and guided in rotation on the turbine casing 26 by means of two guide bearings, respectively upstream 56 and downstream 58.

The first shaft 36 has its downstream end attached to the ring gear 40 of the reduction gear and its upstream end attached to the last stage or downstream stage of the first rotor 22a, i.e. the last wheel of this rotor. The ring gear 40 is also attached to the upstream end of a ring gear carrier 40a, the downstream end of which is attached to or meshed with the downstream end of the shaft 36.

The planet carrier 46 may comprise, here on the downstream side of the reduction gear 42, an annular segment having a C- or S-shaped cross-section so as to confer on the planet carrier a certain flexibility by elastic deformation, in particular in the radial direction as well as in tilting (flexibility in rotation about the axes perpendicular to the motor axis). Because of this flexibility provided by the planet carrier 46, the ring gear carrier 40a of the reduction gear 42 can be rigid. The reverse is possible, under certain conditions. In this case, the ring gear carrier 40a would be flexible or confer a flexibility, and the planet carrier 46 would be rigid. The ring gear carrier 40a would then comprise an annular segment with a C or S shaped cross-section so as to confer to the ring gear a certain flexibility by elastic deformation, in particular in radial as well as in tilting (flexibility in rotation around axes perpendicular to the motor axis). In this second configuration, the flexibility is advantageously integrated outside the force path from the downstream end of the ring gear carrier 40a to the bearing 60.

The shaft 36 is guided upstream by bearings 52, 54 mounted between this shaft 36 and the intermediate casing 24. A first of these bearings is, for example, an upstream roller bearing 52, and a second of these bearings is, for example, a downstream ball bearing 54.

The shaft 36 is further centred and guided in rotation downstream by two guide bearings, respectively upstream 60 and downstream 62 both supported by the exhaust casing 28. These bearings are advantageously placed on either side of the reduction gear 42.

Figure 3:
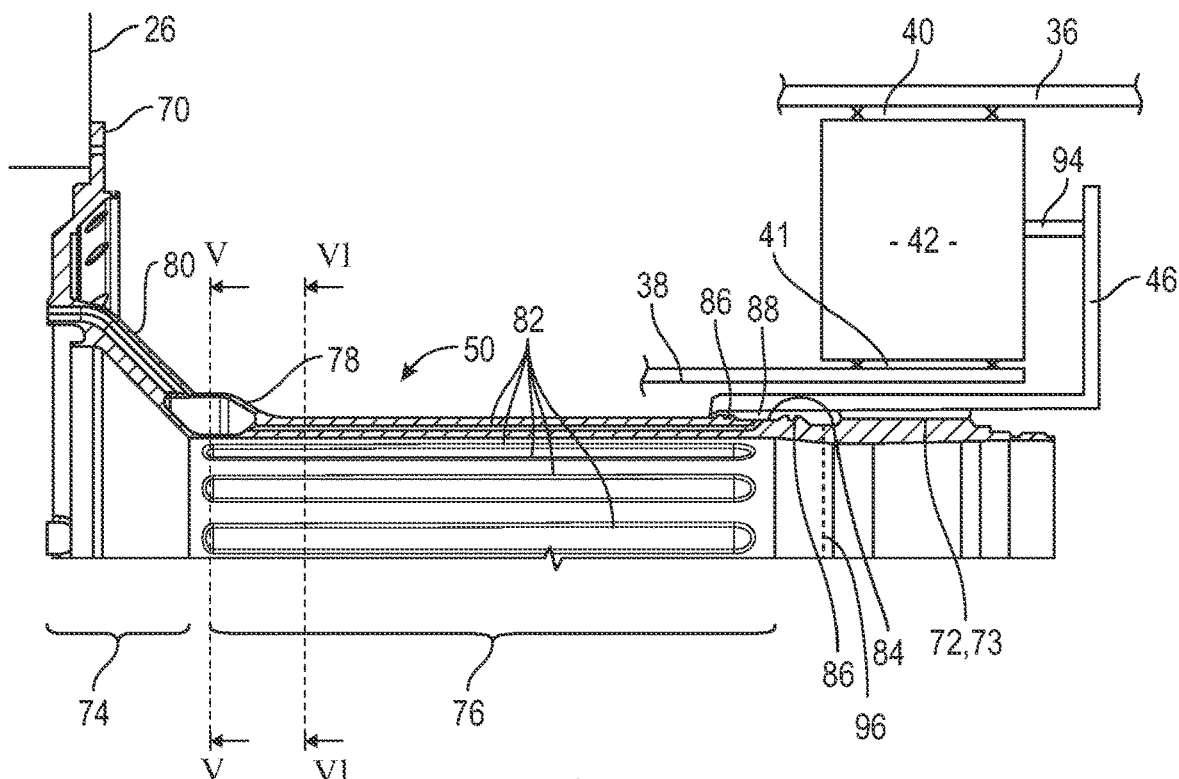
FIG. 3 is a partial schematic view in axial cross-section of a part for connecting a reduction gear planet carrier to a stator casing, for a turbomachine according to the invention.
Figure 4:
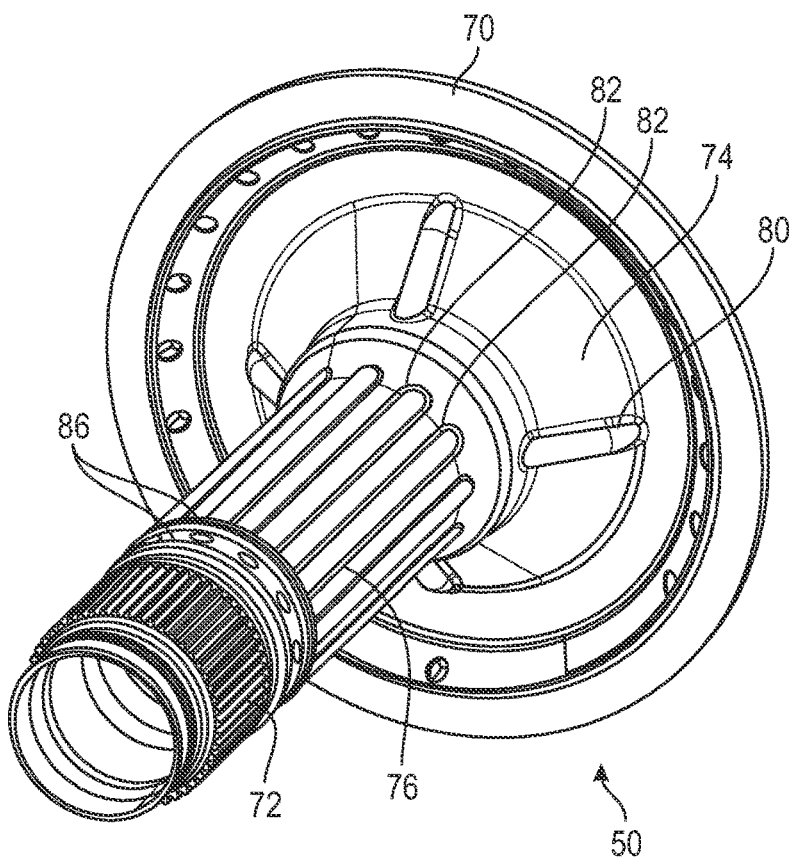
FIG. 4 is a schematic perspective view of the part in FIG. 3, seen from the downstream side.
Figure 5:
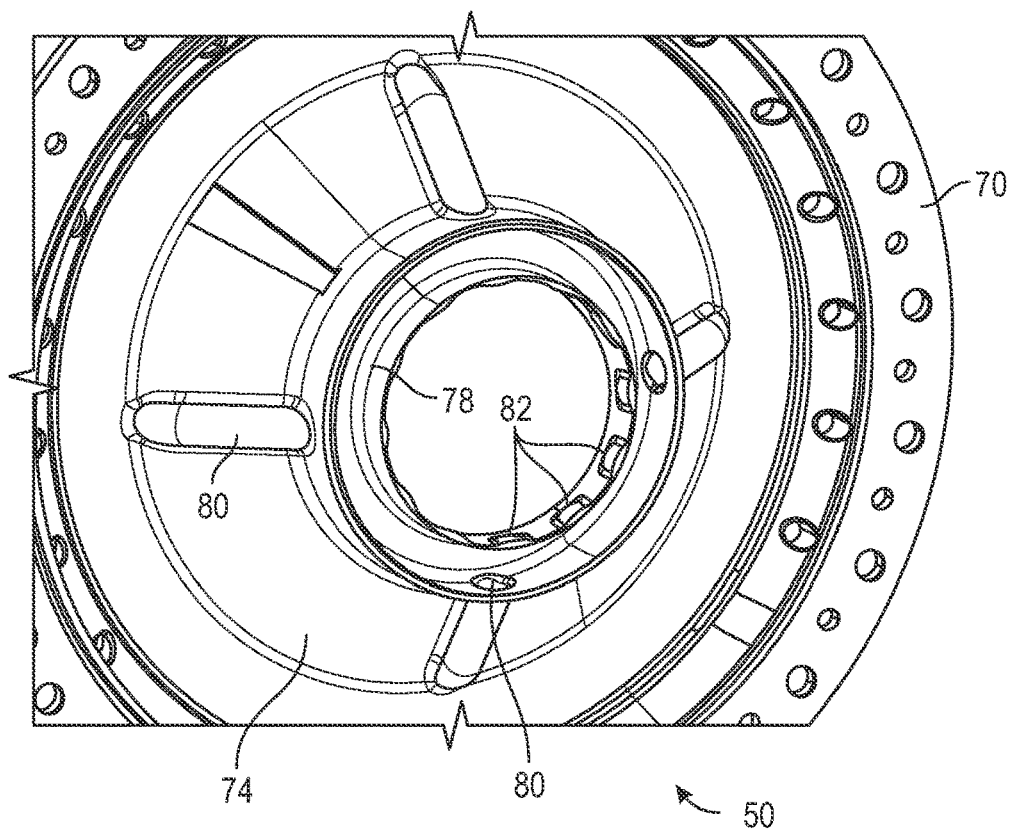
FIG. 5 is a schematic perspective and cross-sectional view of the part in FIG. 3, the cross-section being made at the level of the V-V line in FIG. 3.

FIG. 3 and following illustrate an embodiment of a part 50 for connecting the planet carrier 46 to the casing 26.

In the example shown, the part 50 is one-piece and has a generally elongated, annular, and in particular tubular shape.

It extends around the longitudinal axis of the turbomachine and may be interposed between the shafts 38 and 36, as shown in FIG. 2.

The upstream end (left of FIG. 3) of the part 50 is attached to the casing 26 and comprises, for example, an annular attachment flange 70 by means of screws or bolts.

The downstream (right) end of the part 50 is intended to be coupled to the planet carrier 46 and for this purpose comprises rectilinear splines 72, here male. These splines 72 are intended to be engaged by axial translation in complementary splines 73, and therefore female, of the planet carrier 46.

The part 50 essentially comprises two segments or sections 74, 76 between its ends. A first upstream section 74 is frustoconical and flared upstream. The second section 76 is cylindrical. The first section 74 extends between the flange 70 and the second section 76. The second section 76 extends between the first section 74 and the splines 72.

At the junction between the first and second sections 74, 76, the part 50 may comprise an annular oil circulation cavity 78. This cavity 78 is integrated in the part 50 and can be located in an annular extra thickness of the latter.

This cavity 78 is connected on the one hand to oil inlet pipelines 80 and on the other hand to oil outlet pipelines 82. The cavity 78 has a function of distributing oil from the pipelines 80 and distributing this oil homogeneously in the pipelines 82.

There are 4 pipelines 80 and they are regularly distributed around the axis of revolution of the part 50. They are also integrated in the part and are formed in local extra thicknesses located on the downstream frustoconical face of the first section 74. The pipelines 80 have their downstream ends that open into the cavity 78 and their upstream ends that open axially upstream on an upstream radial face of the section 74 or the upstream end of the part 50.

The number of pipelines 82 is greater than the number of pipelines 80. The pipelines 82 are evenly distributed around the axis of revolution of the part 50. They are also integrated in the part 50 and are formed in longitudinal extra thicknesses located on the external surface of the section 76. The pipelines 82 have their upstream ends that open into the cavity 78 and their downstream ends that open radially onto an external cylindrical surface 84 of the second section 76.

Figure 8:
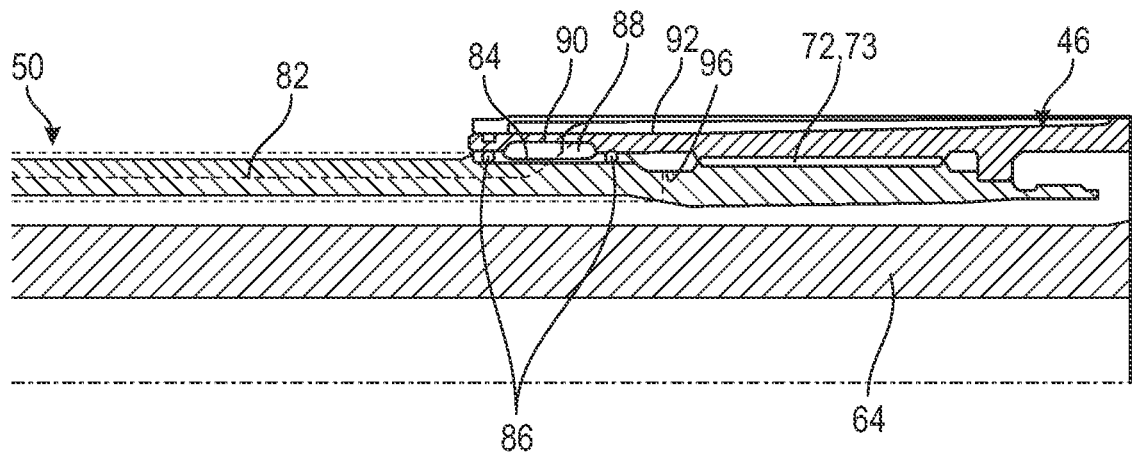
FIG. 8 is a schematic partial axial cross-section view of the part in FIG. 3 and a reduction gear planet carrier.

This surface 84 extends between two annular bosses comprising annular grooves 86 for receiving annular seals. These seals are configured to cooperate with a portion of the planet carrier 46, as shown in FIG. 3 and also in FIG. 8. An annular oil-receiving space 88 is defined between the surface 84 and a portion of the planet carrier 46 and allows oil to circulate from the integrated circuit in the part 50 to the integrated oil circuit in the planet carrier 46. Thus, the planet carrier 46 comprises orifices 90 opening radially inward into the space 88 and communicating with oil pipelines 92 integrated into the planet carrier 46, for conveying oil to the axles 94 of the planet gears 41, for example.

Figure 6:
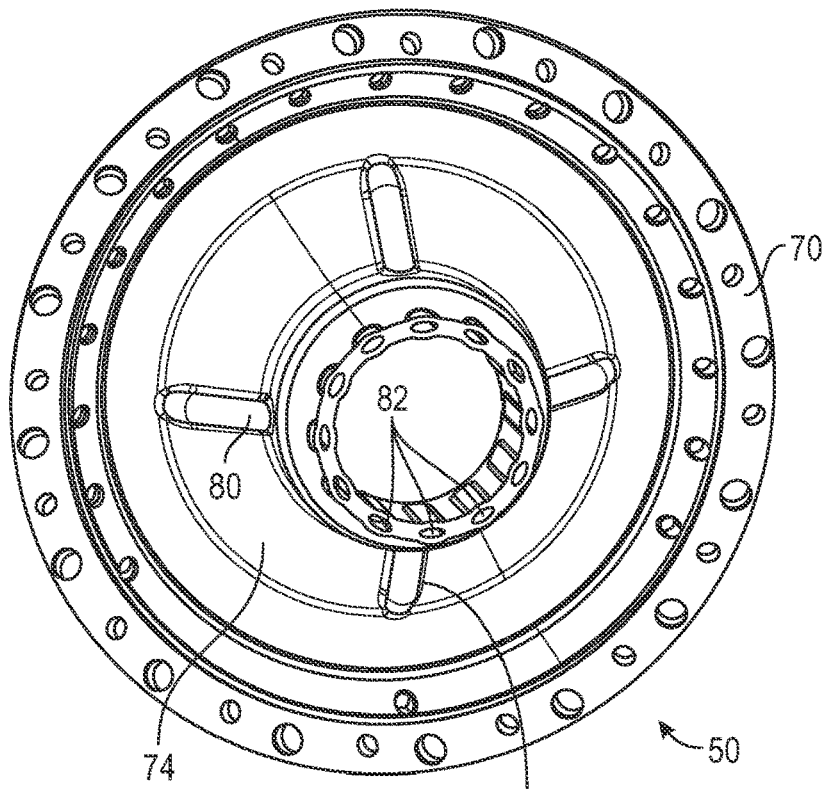
FIG. 6 is a schematic perspective and cross-sectional view of the part in FIG. 3, the cross-section being made at the level of the VI-VI line in FIG. 3.
Figure 7:
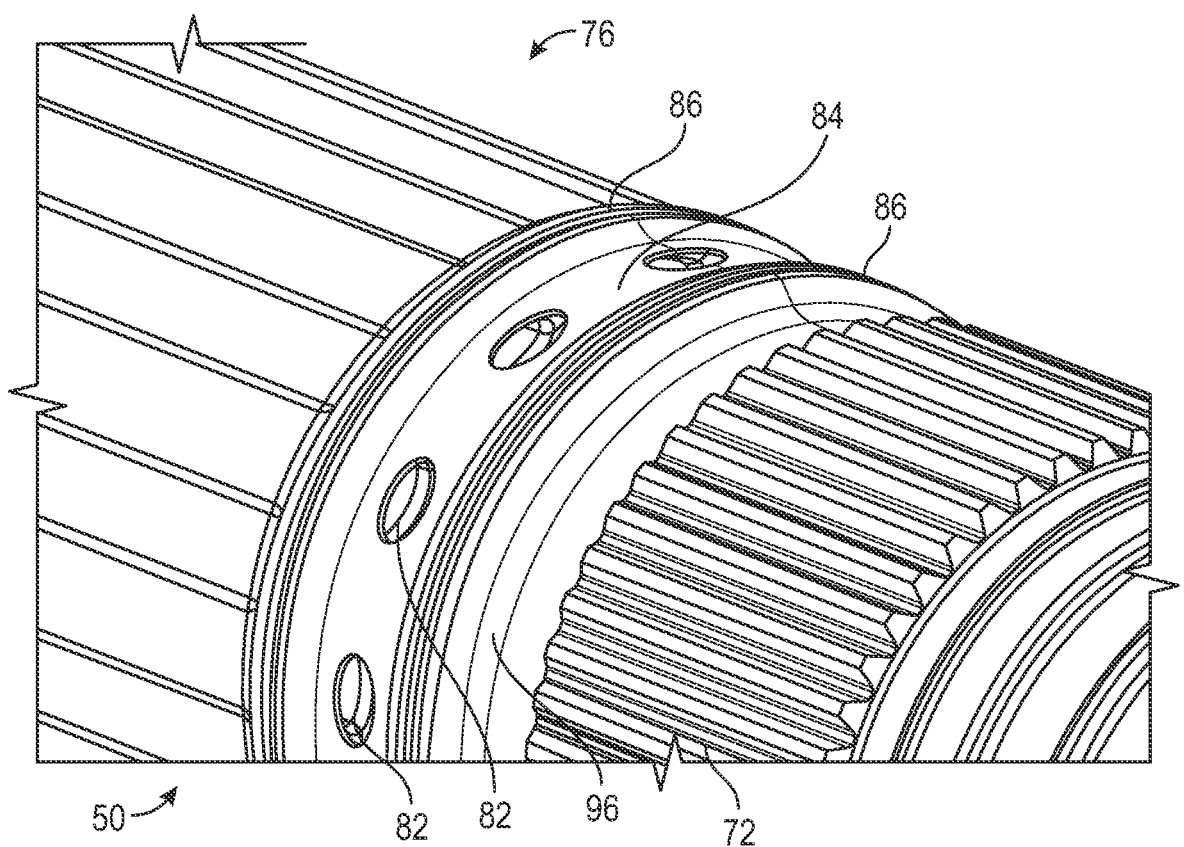
FIG. 7 is a schematic partial perspective view of a portion of the part in FIG. 3.

FIGS. 6 and 7 allow to show that the pipelines 82 are advantageously elliptical in cross-section with the smallest diameter in the radial direction to limit the radial overall dimension of the part while maximizing the pipeline cross-sections.

The number of pipelines 80, 82 and their passage cross-sections are determined in order to be able to pass the quantity of oil necessary for lubrication and cooling of the reduction gear. Several pipeline shapes are possible, from circular to elliptical. Nevertheless, since the part 50 is subject to torsional stress, elliptical-shaped pipelines are preferred, allowing to considerably limit the concentration of constraints at the level of the part, and thus to obtain a design which is optimal in terms of mass and overall dimension.

Moreover, such a one-piece part can only be easily manufactured by additive manufacturing. However, the mechanical properties of the additive manufacturing are generally inferior to those of a forged material. The significant forces transiting through the part do not allow the splines 72 to be made downstream from a material manufactured by additive manufacturing.

In order to overcome this problem, the part 50 is preferably manufactured in two portions: the upstream portion by additive manufacturing with the pipelines 80, 82 integrated. The upstream portion comprises the upstream end for attachment to the stator casing and at least partly the integrated lubricating oil conveying circuit, in particular the integrated pipelines 80, 82. The upstream portion thus advantageously comprises the frustoconical section 74 and the cylindrical section 76. Then the downstream portion of the part is produced by forging, the downstream portion comprising the downstream end of coupling to the planet carrier. In particular, the downstream portion with the splines 72 is produced of forged material with better mechanical characteristics. The two portions would be connected together by welding, with the welding performed between the splines 72 and the surface 84. The reference 96 in FIGS. 3 and 7 designates the annular weld bead of these two portions.

The use of splines 72 to transmit the torque also allows for ensuring an easier disassembling of the reduction gear and reduces the overall dimension of the upstream oil enclosure. A flange would have been much bulkier and therefore would have limited the possibility of integrating the shaft 64.

The oil passage is made upstream of the splines 72 via a transition area defined by the space 88 between the planet carrier 46 and the part 50 (see FIG. 3). The seals carried by part 50 ensure the sealing of this area and the good transfer of oil at the junction between the two elements.

The cavity 78 allows the oil arriving through the pipelines 80 to distribute itself in the pipelines 82, here 12 in number. The use of a larger number of pipelines 82 allows to minimize their radial overall dimension and thus optimizes the integration of the part 50 into the turbine.

The present invention thus provides several advantages:
  it allows to lubricate the reduction gear by means of the planet carrier 46,
  the pipelines 80, 82 with an elliptical cross-section allow oil to be conveyed through a part that is stressed during operation because it is subjected to a transmission of forces by the reduction gear,
  the part 50, although complex, is easily made, at least partly, by additive manufacturing,
  the splines 72, which are the seat of high constraint concentrations, are produced by forging so that they have good mechanical properties.

The invention claimed is:

1. A turbomachine with a counter-rotating turbine for an aircraft,
  the turbomachine comprising a counter-rotating turbine a first rotor of which is configured to rotate in a first direction of rotation and is connected to a first turbine shaft, and a second rotor is configured to rotate in an opposite direction of rotation and is connected to a second turbine shaft, the first rotor comprising turbine wheels interposed between turbine wheels of the second rotor,
  the turbomachine further comprising a mechanical reduction gear with an epicyclic gear train of the planetary type which comprises a sun gear driven in rotation by said second shaft, a ring gear driven in rotation by said first shaft, and a planet carrier attached to a stator casing of the turbomachine located upstream of the counter-rotating turbine with respect to a direction of flow of the gases in the turbomachine,
  wherein the planet carrier is attached to the stator casing by means of an annular part with an elongated shape extending inside said second shaft, the part comprising an upstream end attached to the intermediate casing and a downstream end coupled to the planet carrier, and the part comprises an integrated circuit for conveying lubricating oil from its upstream end to the planet carrier.

2. The turbomachine of claim 1, wherein said part is one-piece.

3. The turbomachine according to claim 1, wherein said part comprises a frustoconical section and a cylindrical section, the frustoconical section extending between said upstream end and the cylindrical section, and the cylindrical section extending between the frustoconical section and splines for coupling to the planet carrier.

4. The turbomachine of claim 3, wherein said circuit comprises an internal annular cavity at a junction between the frustoconical and cylindrical sections.

5. The turbomachine of claim 4, wherein said circuit comprises oil inlet pipelines which are formed in an extra thickness or in bosses in the frustoconical section and which extend upstream from said annular cavity to orifices located on an upstream face of the upstream end.

6. The turbomachine according to claim 4, wherein said circuit comprises oil outlet pipelines which are formed in an extra thickness or in bosses in the cylindrical section and which extend downstream from said annular cavity to orifices located on an external cylindrical surface of the part, upstream of the splines.

7. The turbomachine according to claim 6, wherein said cylindrical surface is located between two annular grooves configured to receive annular seals.

8. The turbomachine of claim 5, wherein at least some of the pipelines are elliptical in cross-section.

9. The turbomachine according to claim 3, wherein the splines are separated from the rest of the part by an annular weld bead.

10. The turbomachine according to claim 1, wherein said planet carrier is generally L-shaped in cross-section and comprises a radial segment for supporting the axles of the planet gears, and a cylindrical segment for coupling to said part, the planet carrier further comprising an integrated circuit configured to convey oil from said part.

11. The turbomachine according to claim 1, wherein the turbomachine is of the type with a single shrouded fan.

12. A method for manufacturing an annular part for attaching a planet carrier to a stator casing of a turbomachine according to claim 1, the method comprising the steps of:
  a) producing an upstream portion of the part by additive manufacturing, the upstream portion comprising the upstream end configured to attach to the stator casing and at least partly the integrated lubricating oil conveying circuit;
  b) producing a downstream portion of the part by forging, the downstream portion comprising the downstream end configured to couple to the planet carrier;
  c) welding the upstream and downstream portions.

13. The manufacturing method of claim 12, wherein the downstream portion of the part comprises splines configured to be coupled to the planet carrier and the upstream portion of the part comprises a frustoconical section and a cylindrical section, the frustoconical section extending between said upstream end and the cylindrical section, and the cylindrical section extending between the frustoconical section and the splines of the downstream portion.

* * * * *